US005269059A

United States Patent [19]

Rozenbojm

[11] Patent Number: 5,269,059

[45] Date of Patent: Dec. 14, 1993

[54] METHOD OF INSTALLING A SLIDE LOCKING MECHANISM IN A PRESS

[75] Inventor: Decio Rozenbojm, Columbus, Ohio

[73] Assignee: Schuler Incorporated, Columbus, Ohio

[21] Appl. No.: 867,336

[22] Filed: Apr. 13, 1992

[51] Int. Cl.[5] .................... B23P 11/00; B30B 15/10

[52] U.S. Cl. .................... 29/893.1; 29/401.1; 72/444; 100/53

[58] Field of Search .................... 29/893.1, 893.2, 401.1, 29/428; 100/53, 282, 292; 188/31, 60, 69, 265; 72/436, 444

[56] References Cited

U.S. PATENT DOCUMENTS

| | | | |
|---|---|---|---|
| 2,417,781 | 3/1947 | Patrick | 72/444 |
| 4,166,415 | 9/1979 | Spanke et al. | 100/53 |
| 4,238,950 | 12/1980 | Carrieri et al. | 72/446 |
| 4,822,266 | 4/1989 | Amano et al. | 72/436 X |

FOREIGN PATENT DOCUMENTS

| | | | |
|---|---|---|---|
| 2384198 | 10/1978 | France | 72/444 |
| 63-273529 | 11/1988 | Japan | 72/444 |

*Primary Examiner*—Mark Rosenbaum
*Assistant Examiner*—S. Thomas Hughes
*Attorney, Agent, or Firm*—Barbara Joan Haushalter

[57] ABSTRACT

A method of installing a slide locking mechanism in a press mechanism so as to lock a press slide of the press mechanism in any of a plurality of positions. The press mechanism includes a gear train mounted in a housing. An installable slide locking mechanism, which includes a gear reducer and a locking gear, is mounted adjacent an opening made in the gear train housing. The gear reducer meshes with an input gear of the gear train, thereby preventing rotation of the gear train when the locking gear is moved to a locking position with respect to the gear reducer.

6 Claims, 3 Drawing Sheets

METHOD OF INSTALLING A SLIDE LOCKING MECHANISM IN A PRESS

BACKGROUND OF THE INVENTION

The present invention relates generally to a slide locking apparatus for a press mechanism and a method of adapting the apparatus to the press mechanism so as to economically and expeditiously lock movement of a press slide in anyone of a variety of positions.

In the automobile industry, large double action and transfer presses are operated for making a variety of automobile body parts. Such presses, press metal blanks mounted on separate dies into auto parts, such as hoods, side panels, etc. Typically, these presses include a vertically reciprocatable pressing slide which is massive and has, for example, capacities up to thousands of tons of pressure that are exerted on the metal blanks held by the dies. Moreover, the dies themselves can weigh in the order of 40 or 50 tons.

Presently in the automobile industry, it is extremely desirable to produce fewer body parts before a die change is effected, and thus die changes are done more often. In this regard, it is also desirable to minimize production interruption for a die change in normal circumstances. Thus, die changes are desired to be completed fairly quickly and, in some cases, within minutes. Die change procedures, and indeed the art of presses in general is well-developed. A die is in place on a moving bolster which is in production in the press, while another die is placed on a second moving bolster located outside the press awaiting the next production run. A typical series of steps for changing the dies include removing the production die via the moving bolster, for example an automobile side panel, from the press and, thereafter, then positioning the second moving bolster carrying the hood die into the press. It is, of course, desirable to not only move the die and bolster as promptly as possible, but to avoid the risk of damage to equipment and personnel for failure to secure the press slide adequately. This is often difficult to successfully achieve since the masses involved are considerable. Moreover, during such changes, stringent government mandated safety regulations must be followed to minimize the risk of damage to equipment and personnel. Failure to comply adequately with the safety requirements is not uncommon. One known safety approach utilizes placement of several manually movable safety blocks, between the bottom of a vertically displaceable upper die and the lower die. In practice, the blocks act to prevent damage caused by accidental dropping of the press slide during die maintenance. However, in the work place, it is often the case that workers circumvent these safety rules by not using any or all these cumbersome safety blocks.

In terms of safety, some modern presses of type described utilize another approach for providing safety during die changes. Specifically, these presses utilize a press slide locking mechanism including a locking gear which when actuated mechanically and directly meshingly locks with a gear on the main drive shaft of a gear train assembly. Accordingly, the latter is in a desired locking position and thus halts the transfer of gear train motion and can lock the press slide in any desired stroke position.

Despite the foregoing, none of the heretofore known prior art approaches relate to adapting a locking mechanism of the last noted type to any one of plurality of double acting and transfer presses which are without such a press locking feature. Accordingly, there is a desire to provide the older presses with safety features of the newer presses in an economical and reliable manner.

SUMMARY OF THE INVENTION

In accordance with the present invention there is provided an improved installable locking apparatus for successfully locking press mechanisms, especially press mechanism of the type used in the automobile industry.

In this regard, there is provided a retrofitable slide locking apparatus installable on a press mechanism of the kind that includes gear train means having input means rotatably drivable to operate the gear train means so as to transmit motion and thereby operate a press slide between raised and lowered positions. With the understanding that the mechanical fastening of the upper die, onto the press slide, is the responsibility and liability of the press user. Included in the installable locking apparatus is a housing assembly which is specifically adapted to be mounted on a housing of the gear train means and is arranged for purposes of allowing direct coupling of the gear train input means with the installable locking apparatus. Provision is made for gear coupling means in the installable housing assembly that is directly couplable with the input gear means of the gear train means. A locking means is provided in the installable housing assembly and includes a locking gear movable between locking and non-locking conditions. Operably connected to the locking gear is means selectively operable for moving the former between its locking and non-locking conditions.

In an illustrated embodiment, the gear coupling means is defined by a gear reduction assembly including a gear reduction shaft having first and second gear assemblies at opposite ends thereof. The first gear assembly is constructed to be selectively engagable with the locking gear while the second gear assembly directly meshingly engages the input gear means of the gear train means.

In another illustrated embodiment, the locking gear is provided with an integral stop mechanism radially extending therefrom and registers with an opening in the installable housing assembly for restricting the rotational displacement of the locking gear and thereby halting rotation of the gear reduction shaft. Consequently, transmission of movement of the gear train means is inhibited so as to lock the press slide in a desired position.

In another illustrated embodiment, the locking gear includes a plurality of circumferentially spaced teeth which are adapted to cooperate with a gear member forming the first gearing assembly upon longitudinal displacement of the locking gear.

Another illustrated embodiment of this invention is directed to a method of installing such a locking apparatus to a press mechanism including the steps of: providing an installable locking apparatus having a housing assembly mountable on a housing of a gear train means of the press mechanism for allowing coupling of the locking apparatus to an input means of the gear train means; providing gear coupling means in the housing assembly which is selectively couplable to the gear input means; providing a locking means including a locking gear movable between locking and non-locking conditions; providing means operable for moving the locking gear between the locking and nonlocking positions; accessing the input gear means to the locking apparatus by providing an opening adjacent the input gear means; and mounting the locking apparatus to the press mechanism housing so that the gear coupling means is directly couplable to the input gear means.

Among the objects of the present invention are, therefore, the provision of an installable locking apparatus which is adaptable to a variety of presses; the provision of an installable locking apparatus which positively locks a press sliding device in anyone of a plurality of positions; the provision of a hydraulically activated locking mechanism which positively locks a gear train assembly of a press mechanism; the provision of an improved locking mechanism of the last noted type which can hold the weight of the upper dies on a press slide even if the slide locking actuator fails; the provision of an improved press slide locking mechanism which is activated to quickly and easily effect the noted positive locking action.

Other objects and further scope of applicability of the present invention will become apparent from a detailed description thereof to follow when taken in conjunction with accompanying drawings wherein like reference numerals indicate like parts throughout the several views.

DETAILED DESCRIPTION

Figure 1:
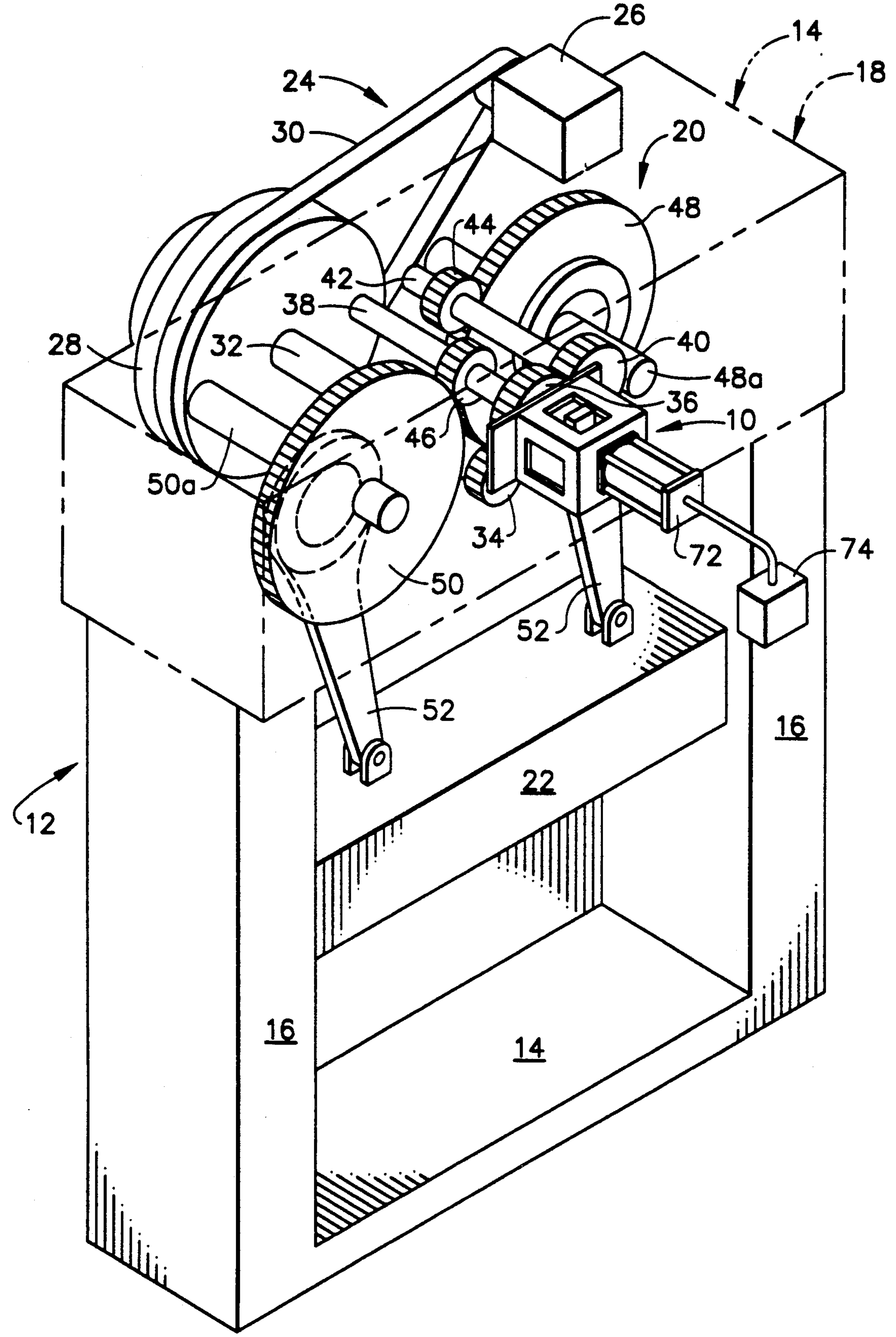
FIG. 1 is a perspective schematic view of one embodiment made accordingly to the present invention.
Figure 2:
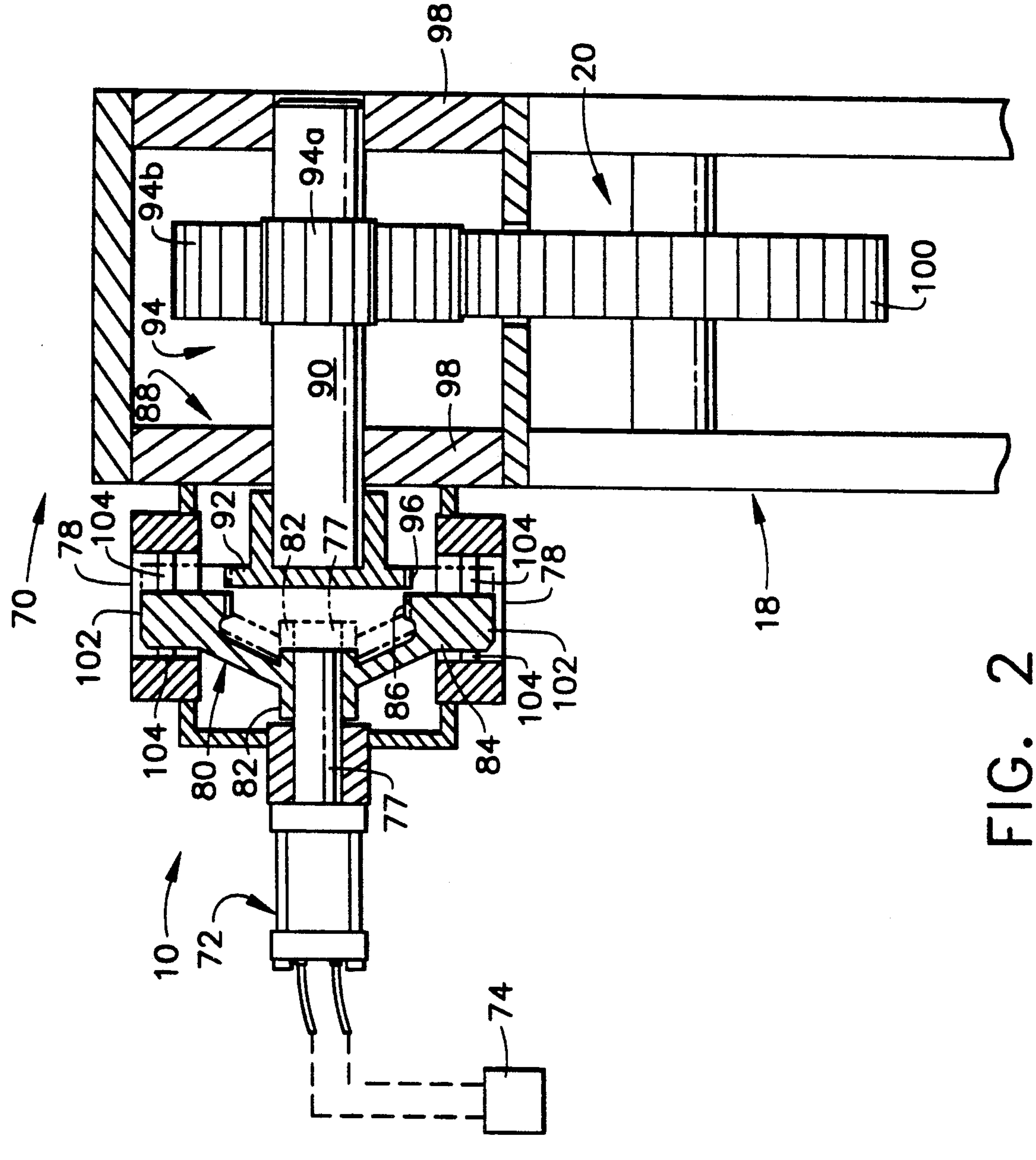
FIG. 2 is a cross-sectional view of a locking apparatus made according to the present invention shown in a different installable position.
Figure 3:
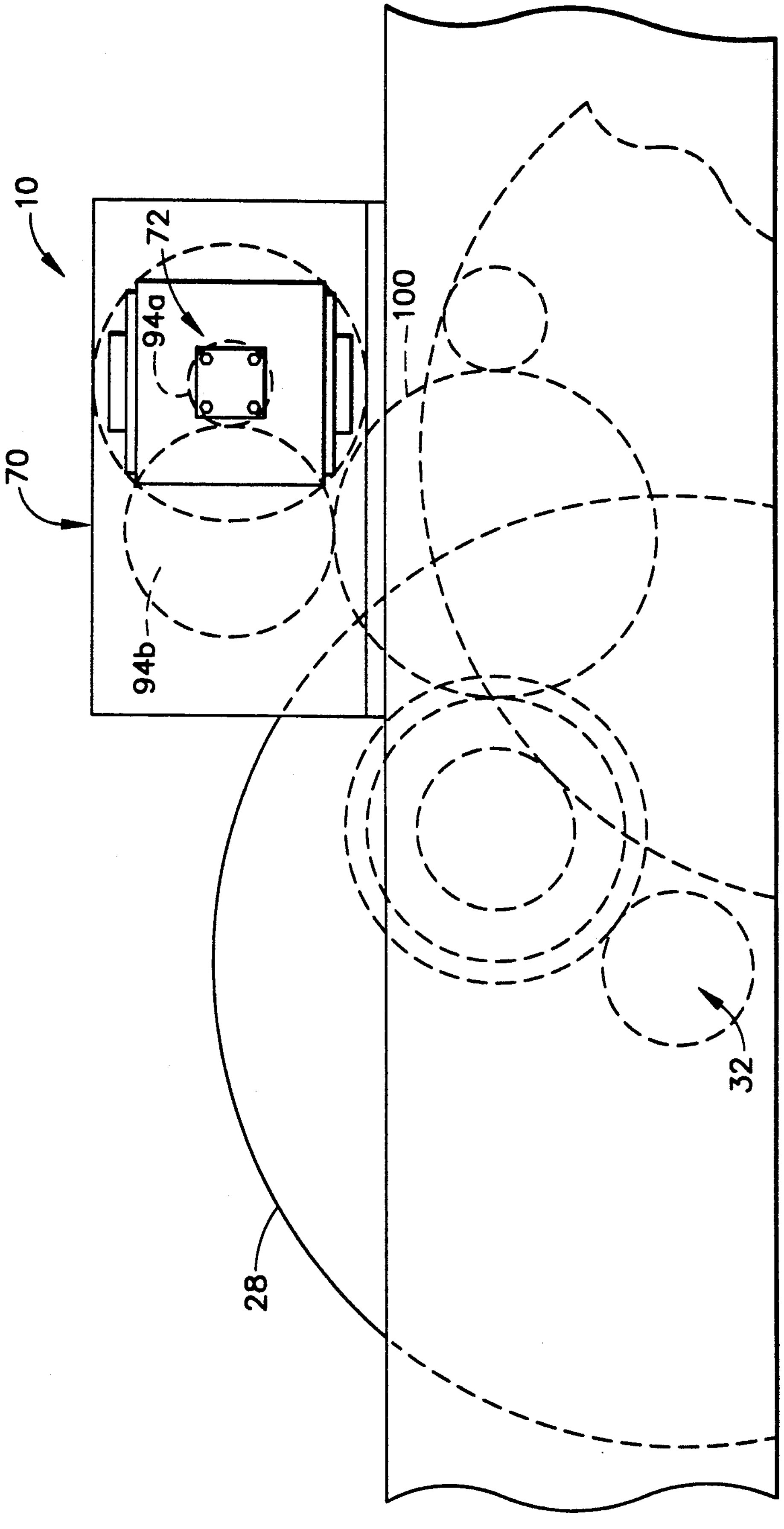
FIG. 3 is an elevational view of the embodiment shown in FIG. 2.

Reference is made to FIGS. 1-3 for illustrating an installable locking apparatus 10 made according to the principles of the present invention. The installable locking apparatus 10 is a separable unit which is specifically couplable to a wide variety of presses, such as a transfer press mechanism of the type schematically depicted by reference numeral 12. These kinds of presses are used in the large scale production of automobile body parts, such as hoods, side panels and the like. It is noted that in the following description the illustrated press mechanism 12 is but one of several types to which the present invention can be adapted.

In FIG. 1, the press mechanism 12 is depicted schematically and is shown to include a press bed 14, a pair of upright supports 16, and a gear train housing assembly 18 connected to and between the upright supports. The gear train housing assembly 18 houses a gear train mechanism depicted by reference numeral 20, which is operable to vertically reciprocate a press slide device 22 between raised and lowered or pressing conditions when operated by a gear train drive assembly 24. When changing dies (not shown) on bolsters (not shown) the press slide 22 can be locked in any one of a plurality of raised conditions.

The press drive assembly 24 includes an electric drive motor 26 that rotatably drives a driver pulley 28 through a drive belt 30. The driver pulley 30 is coupled directly to a main drive shaft 32 which is journalled suitably for rotation within the gear train housing assembly 18. Rotation of the main drive shaft 32 in opposite directions results in corresponding raisings and lowerings of the press slide 22 in a known manner to effect the desired pressing operations. The main drive shaft 32 has fixed thereto a gear 34 which is meshingly engaged with a spur gear 36 affixed to a suitably journalled spur gear shaft 38. The spur gear 36 also positively drives idler gear 40 which is fixed to a rotatable idler shaft 42 that carries a fixed spur gear 44. The spur gear shaft 38 also fixedly carries a gear 46. Both the gears 44 and 46 meshingly engage with and drive bull gears 48 and 50; respectively. The latter are affixed to corresponding rotatable shafts 48*a*, 50*a*. Eccentric arms 52 are connected to respective ones of the bull gears 48 and 50 and the top of the press slide 22. By virtue of the foregoing construction, rotation of the main drive shaft 32 rotates the bull gears 48, 50 so as to reciprocatively raise or lower the press slide 22. In this embodiment, the installable locking apparatus 10 is shown connected to a side wall of the housing assembly 18, and through an opening (not shown) in the sidewall is in direct communication with the gear train assembly 20 so as to positively lock the gear train assembly and thereby the press slide 22 in anyone of a plurality of positions. The depiction of the locking apparatus is attached to the side wall of the housing assembly 18 in this embodiment is an example of but one of a variety of positions it can have relative to the press mechanism. For a better understanding of how the installable locking apparatus operates to positively lock the press slide and how versatile it is in terms of installing to a press mechanism, reference is made to FIGS. 2 and 3. Reference is made to FIGS. 2 and 3 for purposes of illustrating a preferred embodiment of the installable locking apparatus 10. In contrast to the illustrated embodiment of FIG. 1, the locking apparatus 10 is attached to a wall of the gear train housing assembly 18 so as to cooperate with the gear train mechanism 20; in a manner which will be described hereinafter. In this embodiment, however, the installable locking apparatus 10 is coupled to a top surface of the gear train housing assembly 18. As will become evident, the locking apparatus 10 can be connected to the gear train in a variety of ways so long as it achieves the desired locking. A hydraulic piston cylinder arrangement 72 is attached to one end of a housing assembly 70 and has fluid lines connected to a suitable pump 74 (FIG. 1) which selectively controls the introduction and exhaustion of pressurized hydraulic fluid into the hydraulic cylinder 76 so as to selectively operate the same operation of the hydraulic cylinder 76 results in a piston rod 77 reciprocating between the solid line position shown in FIG. 2 to a dotted line position. As will be explained when in the latter position, a locking condition is established which will arrest movement of the gear train assembly and the latter will be unable to transmit motion to the press slide 22. Other sources of motive power besides hydraulic piston and cylinder motors can be used for purposes of achieving desired reciprocating movement. For effecting the locking or motion arresting function as will be explained, the housing assembly 70 is also provided with a pair of diametrically opposed openings 78. A locking gear assembly 80 is suitably housed within the housing assembly 70 and includes a hub portion 82 which is suitably mounted on the piston rod 77 so as to be movable in unison therewith between the depicted non-locking condition and the locking condition. Radially extending from the hub 82 is an internally oriented circumferential locking gear 84 which includes a plurality of teeth or splines 86 which are suitably formed and angled in spaced apart angular relationship with respect to each other by a sufficient distance so as to facilitate the meshing interlocking thereof with a gear reduction assembly 88 forming part of the locking apparatus 10.

The present invention envisions a variety of gear reducing arrangements in the installable locking apparatus, the construction of which depends on the gear train mechanism to which the apparatus will interrelate with. In this embodiment, the gear reduction assembly 88 includes a gear reduction shaft 90 having first and second spur gear arrangements affixed at opposite ends thereof 92 and 94; respectively. The gear reduction shaft 90 is journalled for rotation in wall members 98 of the housing assembly 70. The first spur gear 92 has externally oriented teeth 96 which are adapted to lockingly mesh with gear teeth 86 of the locking gear 84. The second spur gear assembly 94 is mounted rotatably within the housing assembly 70 and is in meshing engagement with a spur gear 100 of the gear train assembly which spur gear is comparable to gear 40. The spur gear assembly 94 includes a smaller diameter spur gear 94*a* and a corresponding larger diameter meshing gear 94*b*; the latter of which is in meshing engagement with the spur gear 100. Accordingly, preventing the rotation of the reduction gear shaft 90 by virtue of its cooperation with the locking gear 84 will result in a locking of the spur gear 100 of the gear train assembly 20. Rotation is prevented because the locking gear 84 includes a pair of radially extending portions 102 (FIG. 2) which register with the openings 78. Once engagement of the gear teeth 86 and 96 is effected the spur gear 92 is prevented from rotation. This is because the portions 102 are prevented from rotating since they engage the housing 70. A pair of flat springs 104 is mounted in each opening 78 and straddle the locking portion 102. The springs 104 act to allow some rotational movement of the locking portion 102 should the gears 86 and 96 not initially mesh upon actuation of the piston cylinder arrangement and also serve to center the locking portion upon disengagement once the spur gear 100 is positively locked against rotation, the entire drive system of the press mechanism is prevented from transmitting motion. Retraction of the locking gear 84 to its solid line position occurs by reason of the piston rod 77 being retracted into the piston cylinder arrangement 76. As a result, the locking gear 84 is no longer engaged and the gear 100 is free to rotate and therefore allows transmission of motion by the gear train. Also, with the locking gear 84 engaged even if the hydraulic system loses power, the locking gear 84 will remain in place to maintain the locking engagement. Accordingly, it will be appreciated that there is provided an apparatus which is easily couplable to the gear train assembly of any press mechanism by merely adapting the gear reduction assembly to suit the desired needs. Consequently, because of the novel arrangement of the present invention, there is provided an expeditious manner for effectively and efficiently locking the gear train such that the press slide mechanism can be stopped at any one of a variety of positions during its stroking operation.

While the foregoing embodiment discloses one particular gear reduction arrangement for locking the press slide of the press mechanism, it will be appreciated that the present invention envisions a plurality of gear reduction arrangements that can be successfully adapted to the gear train mechanism. While the gear reduction assembly includes spur gears arranged as depicted, it will be appreciated that various other gearing arrangements for coupling the locking gear to the gear train assembly are contemplated. For example, helical gear arrangements, and bevel gear arrangements can be used for purposes of interconnecting the gear train assembly of the press with the locking gear. Also, while the foregoing embodiment is successful in connection with being mounted on the crown of a press housing assembly, it would be appreciated that this invention envisions installation to different locations relative to the gear train mechanism of the press mechanism. Of course, suitable access openings in the gear train housing are provided for allowing interconnecting of the locking apparatus to the gear train.

Since certain changes maybe made in the above described apparatus without departing from the scope of the invention involved, it is intended that all matter contained in the description thereof or shown in the accompanying drawings shall be interpreted as illustrative and not in a limiting sense.

What is claimed:

1. A method of installing an installable slide locking mechanism in a press mechanism so as to lock a press slide of the press mechanism in any of a plurality of positions, the press mechanism includes a gear train means rotatably drivable so as to reciprocate the press slide, said installation method comprising the steps of:

providing a slide locking apparatus having a locking assembly mountable on a housing of the gear train means for allowing coupling of the locking apparatus to the gear train means so as to prevent transmission of motion of the latter;

accessing the gear train means by making an opening in the gear train housing;

providing a gear reducing means in the locking assembly which is meshingly engageable to the gear train means;

providing a locking means in the locking assembly including a locking gear which is movable between locking and non-locking conditions with the gear reducing means;

providing means operable for moving the locking gear between locking and non-locking conditions; and mounting the slide locking apparatus to the press mechanism adjacent the opening thereof so that the gear reducing means is meshing with the input gear of the gear train means, whereby preventing rotation of the gear reducing means prevents rotation of the gear train means and thus halts reciprocation of the press slide.

2. A method of installing an installable slide locking mechanism in a press mechanism so as to lock a press slide of the press mechanism in any of a plurality of positions, the press mechanism including a gear train means rotatably drivable so as to reciprocate the press slide, the installation method comprising the steps of:

a) providing an opening in a housing of the gear train means for accessing the gear train means;

b) providing an installable slide locking housing;

c) providing gear coupling means in the installable slide locking housing that is directly couplable with an input gear means of the gear train means;

d) providing locking gear means including a locking gear movable between locking and non-locking conditions with respect to the gear coupling means, such that when the locking gear is in the locking condition it engages the gear coupling means to prevent it from rotating and prevent the gear train means from transmitting motion; and e) mounting the installable slide locking housing to the press mechanism adjacent the opening in the gear train housing to prevent rotation of the gear train means and thus halt reciprocation of the press slide.

3. A method of installing an installable slide locking mechanism as claimed in claim 2 wherein said locking gear means includes means operably connected to said locking means for moving said locking gear between said locking and non-locking conditions.

4. A method of installing an installable slide locking mechanism as claimed in claim 2 wherein said gear coupling means includes gear reduction means, said gear reduction means including a shaft having a first gear arrangement at one end thereof and a second gear arrangement at an opposite end thereof, said first gear arrangement being selectively engageable with said locking gear means when the latter is in said locking condition, and said second gear arrangement is meshingly engaged with the gear train means.

5. A method of installing an installable slide locking mechanism as claimed in claim 4 wherein said first gear arrangement includes a plurality of externally disposed teeth and said locking gear includes a plurality of internally disposed teeth which are constructed to mesh with said external teeth and said locking gear means includes a portion which abuts said housing of the gear train means to prevent rotation of said locking gear means and thus said gear reduction means to thereby prevent transmission of motion so as to restrain the gear train means.

6. A method of installing an installable slide locking mechanism as claimed in claim 5 wherein said portion is a radially extending projection, which extends through the opening formed in the housing of the gear train means.

* * * * *